United States Patent
Maruyama et al.

[11] Patent Number: 5,946,367
[45] Date of Patent: Aug. 31, 1999

[54] REACTOR CONTROL ROD ELEMENT

[75] Inventors: Tadashi Maruyama, Funabashi; Shoji Onose, Mito, both of Japan

[73] Assignee: Japan Nuclear Cycle Development Institute, Naka-gun, Japan

[21] Appl. No.: 09/209,476

[22] Filed: Dec. 11, 1998

[30] Foreign Application Priority Data

Dec. 11, 1997 [JP] Japan .................................. 9-341739

[51] Int. Cl.$^6$ ...................................................... G21C 7/10
[52] U.S. Cl. ........................................ 376/327; 376/285
[58] Field of Search ................................. 376/285, 327, 376/339

[56] References Cited

U.S. PATENT DOCUMENTS

| | | |
|---|---|---|
| 3,088,898 | 5/1963 | Busby et al. ............................. 376/339 |
| 4,876,060 | 10/1989 | Yoshioka et al. ...................... 376/327 |
| 5,225,151 | 7/1993 | Bernander et al. ..................... 376/327 |
| 5,276,718 | 1/1994 | Ueda ....................................... 376/339 |
| 5,629,965 | 5/1997 | Soga et al. .............................. 376/327 |

*Primary Examiner*—Daniel D. Wasil
*Attorney, Agent, or Firm*—Pillsbury Madison & Sutro LLP

[57] ABSTRACT

A neutron absorbing pin including at least, a neutron absorber, a thin-wall pipe surrounding the neutron absorber, and a cladding disposed at a distance from the thin-wall pipe. In the neutron absorbing pin, the difference between the coefficient of thermal expansion ($\alpha 1$) of the neutron absorber and the coefficient of thermal expansion ($\alpha 2$) of the thin-wall pipe has an absolute value of $|\alpha 2 - \alpha 1| \leq 10 \times 10^{-6}/K$.

4 Claims, 2 Drawing Sheets

REACTOR CONTROL ROD ELEMENT

BACKGROUND OF THE INVENTION

1. Field of the Invention

The present invention relates to a pin (i.e., cylindrical member) for absorbing neutrons, which is an element or component of a reactor control rod (or to a reactor control rod which has been assembled by using such an element). The pin according to the present invention is capable of retaining not only a good mechanical characteristic but also a good compatibility between plural components constituting the pin, even up to a high temperature.

2. Related Background Art

In a nuclear reactor such as fast breeder reactor, it is extremely important to control the operating state or condition of the nuclear reactor (e.g., to control the output of the reactor, to carry out an emergency shutdown, etc.). In order to effect such a control, the reactivity of the reactor(or the degree of the reaction occurring in the reactor) is changed, usually by putting into the reactor a control rod including a neutron absorber (or neutron absorbing material) as a constituent thereof, and taking the control rod out of the reactor in an appropriate manner.

Many of the above-mentioned control rods have a structure comprising an assembly of a plurality of "neutron absorbing pins" bundled together, and each of the neutron absorbing pins comprises a cladding (or covering tube) comprising stainless steel, and a neutron absorber (such as boron carbide ($B_4C$) pellet) inserted therein. In the neutron absorbing pin, the neutron absorber comprising a boron carbide pellet, etc., generally has a cylindrical shape having a high density, which has been sintered by hot-pressing, etc. Usually, a small gap portion is provided between the pellet and the stainless steel cladding.

In many cases, the gap portion has a structure such that it is filled with helium gas, or liquid sodium for the purpose of lengthening the life of the control rod.

The former type of neutron absorbing pins are referred to as "helium-bonded pin", and the latter type of neutron absorbing pins are referred to as "sodium-bonded pin".

It has been known that, during the use of a neutron absorbing pin within a nuclear reactor, when a boron carbide pellet constituting the pin is irradiated with neutrons, $\alpha^{10}B$ (n, $\alpha)^7Li$ reaction occurs, and helium (He) produced from the reaction is accumulated in particles of the boron carbide, whereby the pellet causes swelling (volume expansion).

The change in size or dimension of the boron carbide pellet in the axial direction of the neutron absorbing pin caused by the swelling is usually absorbed by a pellet-pressing spring which is disposed between an end of the pin and the pellet in the control rod in the axial direction thereof, whereby such a phenomenon little causes a problem substantially.

However, when the size or dimension of the boron carbide pellet is increased in the diametrical direction, thereof the gap between the boron carbide pellet and the stainless steel cladding is decreased, whereby the boron carbide pellet and the cladding would finally come into mechanical contact with each other. When the neutron absorbing pin is further used in such a state successively, the degree of the mechanical interaction between the pellet and the cladding is further increased, and the cladding begins to be deformed plastically. When such a plastic deformation exceeds the limit of deformation or strain, there occurs an accident such that the cladding is finally damaged or broken.

In addition, the above-mentioned boron carbide pellet has a tendency such that it is liable to be broken into fine fragments mainly due to a thermal stress occurring in the pellet, while the boron carbide pellet is used in the reactor. When the boron carbide is broken into fine fragments, there occurs a phenomenon such that the fragment of the pellet is moved or relocated in the cladding, or a small fragment enters a crack or cleavage in the pellet, or the gap between the pellet and the cladding. When such a phenomenon occurs, the gap initially provided between the pellet and the cladding is rapidly filled (closed), after the initiation of the irradiation thereof with neutrons. As a result, the mechanical interaction between the boron carbide pellet and the cladding will occur at a point of time which is earlier than that has preliminarily been expected, and the life of the cladding of the neutron absorbing pin (or control rod) is shortened.

In consideration of these circumstances, for the purpose of preventing the fragments of boron carbide from moving in the cladding, there has been proposed a structure wherein a thin-wall pipe (usually, referred to as a "shroud") comprising austenite stainless steel, ferrite steel-stainless steel, etc., is disposed in the above-mentioned stainless steel cladding so that the shroud covers the entire length of the neutron absorber pellet (see, Japanese Patent Publication (KOKOKU) No. Hei 6-31769 (i.e., 31769/1994); and B. T. Kelly et al., "International Conference on Fast Reactors and Related Fuel Cycles," Proceedings Volume III, p 1. 10-1, November 1991).

In the neutron absorbing pin equipped with such a shroud, the fragment of boron carbide is not moved in the cladding, and the neutron absorber is swollen while substantially retaining its original shape, whereby a longer life of the pin can be achieved until the mechanical interaction between the pellet and the cladding is initiated.

When a further long life is intended to be realized in such a neutron absorbing pin equipped with a shroud, it is theoretically possible to lengthen the life of the pin, e.g., by increasing the initial gap between the boron carbide pellet and the cladding. In this case, however, when the gap is increased, the heat transfer efficiency or rate is decreased between the pellet as a heat-generating member under neutron irradiation, and the cladding cooled by a coolant, whereby the temperature of the boron carbide pellet is elevated. Accordingly, the temperature of the shroud pipe becomes too high, and there occurs a phenomenon that the shroud comprising stainless steel becomes unusable.

In order to solve the above-mentioned problem, there has been adopted a measure such that the heat transfer efficiency is enhanced at the gap portion by putting liquid sodium in the gap portion between the cladding and the pellet constituting the neutron absorbing pin (i.e., to cause the pin to have a "sodium-bonded" structure), whereby the surface temperature of the pellet and the working temperature of the shroud are lowered. However, the sodium-bonded pin inevitably poses a problem such that it is difficult to handle the pin in view of the treatment (or disposal) of the sodium at the time at which the control rod is to be produced, the absorbing pin is to be discarded after the use thereof in the reactor, etc. In consideration of these circumstances, it has strongly been demanded to develop a neutron absorbing pin including as a constituent a heat-resistant shroud tube comprising a material other than stainless steel, e.g., in the case of above-mentioned "helium-bonded pin" having excellent characteristics in view of the production and handling thereof.

Further, for example, even in the case of the sodium-bonded pin, when the pin is used for a long period of time, the shroud comprising stainless steel is reacted with the boron carbide pellet, so as to cause carburization, etc., and to loose ductility thereof, whereby the performance or function as a shroud tube is inevitably lowered. Therefore, it has also been demanded strongly to develop a neutron absorbing pin including, as a constituent, a shroud material excellent in compatibility with boron carbide.

SUMMARY OF THE INVENTION

An object of the present invention is to provide a neutron absorbing pin which has solved the above problems encountered in the prior art.

Another object of the present invention is to provide a neutron absorbing pin capable of providing a long life, which includes a shroud excellent in heat resistance.

A further object of the present invention is to provide a neutron absorbing pin capable of providing a long life, which includes a shroud excellent in compatibility with boron carbide.

As a result of earnest study, the present inventors have found that, in view of the provision of a longer life of a neutron absorbing pin under irradiation thereof with neutrons, the interrelation between the thermal expansion characteristics of the materials (particularly, the materials adjacent to each other) constituting the pin is extremely important.

As a result of further study based on the above-mentioned discovery, the present inventors have also found it extremely effective in achieving the above-mentioned object to set to a specific range the absolute value of the difference between the coefficients of thermal expansion $\alpha1$ and $\alpha2$, respectively) of the neutron absorber and thin-wall pipe (shroud), which are elements adjacent to each other in the neutron absorbing pin.

The neutron absorbing pin according to the present invention is based on the above-mentioned discovery and comprises: at least, a neutron absorber, a thin-wall pipe surrounding said neutron absorber, and a cladding disposed at a distance from the thin-wall pipe; wherein the difference between the coefficient of thermal expansion ($\alpha1$) of the neutron absorber and the coefficient of thermal expansion ($\alpha2$) of the thin-wall pipe has an absolute value of $|\alpha2-\alpha1| \leq 10 \times 10^{-6}/K$.

As described above, in the present invention, the absolute value of the difference between the coefficient of thermal expansion of the neutron absorber ($\alpha1$) and the coefficient of thermal expansion of the thin-wall pipe ($\alpha2$) is set to a value satisfying the relationship of $|\alpha2-\alpha1| \leq 10 \times 10^{-6}/K$. Accordingly, even when the neutron absorber (such as boron carbide) and the thin-wall pipe are thermally expanded under the irradiation thereof with neutrons, the adhesion or close contact property between them is retained due to the above-mentioned small difference in the thermal expansion therebetween. As a result, the neutron absorber is more effectively held or supported by the thin-wall pipe, whereby the life of the neutron absorbing pin can be lengthened.

In the present invention, as the material constituting the above-mentioned thin-wall pipe (shroud), a fiber-reinforced composite material (particularly, ceramic fiber-reinforced composite material) may suitably be used.

In such an embodiment, the fiber-reinforced ceramic composite material has a characteristic suitable for producing a shroud as a thin-wall pipe, and further shows a mechanical strength higher than that of the pipe comprising a ceramic material alone. In addition, even when a stress which can cause fracture or breakage thereof, the fiber-reinforced ceramic composite material shows a ductile characteristic based on the pull-out (or drawing) effect of the fibers, etc., and has a characteristic suitable for the function or performance as a shroud tube. Such a composite material can almost completely overcome the brittleness or fragility as a defect of the ceramic alone.

In contrast, according to the present inventors' study, it has been found that, when a ceramic material (such as silicon carbide and alumina) is simply used as a heat-resistant material in place of the conventional stainless steel, it is extremely difficult to shape the ceramic material itself into a thin-wall pipe, and even when the ceramic material is successfully shaped into a thin wall, the resultant thin-wall pipe has a low strength and shows a brittleness fracture characteristic, and therefore such a material is mechanically unstable. Consequently, according to the present inventors' study, the above-mentioned problems cannot be solved by simply using a thin-wall pipe comprising a monolithic ceramic material in place of the conventional thin-wall pipe comprising stainless steel.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the above FIGS. 1–3, the reference numerals have the following meanings.

1: sleeve, 2: core material, 3: releasing paper, 10: neutron absorber, 11: shroud, 12: gap, and 13: cladding.

DESCRIPTION OF PREFERRED EMBODIMENTS

Hereinbelow, the present invention will be described in detail with reference to the accompanying drawings, as desired. In the following description, "part(s)" and "%" representing amounts and ratios are based on weight unless otherwise noted specifically.

(Neutron Absorbing Pin)

The neutron absorbing pin according to the present invention is a pin which comprises, at least, a neutron absorber, a thin-wall pipe surrounding the neutron absorber, and a cladding disposed at a distance from the thin-wall pipe. In the neutron absorbing pin, the difference between the coefficient of thermal expansion of the neutron absorber ($\alpha1$) and the coefficient of thermal expansion of the thin-wall pipe ($\alpha2$) has a value satisfying $\alpha2-\alpha1| \leq 10 \times 10^{-6}/K$.

In the present invention, the above-mentioned coefficient of-thermal expansion can be measured by the following method.

(Method of Measuring Coefficient of Thermal Expansion)

The coefficient of thermal expansion can sufficiently be measured by a standard measuring method which has been used for measuring thermal expansion of ceramic, such as a push-rod type differential thermo-dilatometer, optical interference thermo-dilatometer, etc.(see, e.g., "Corpus of Fine Ceramics Evaluation Techniques," editorial supervisor: Hiroshi Okuda, et al., Realize Inc., 1984, etc.).

Figure 1:
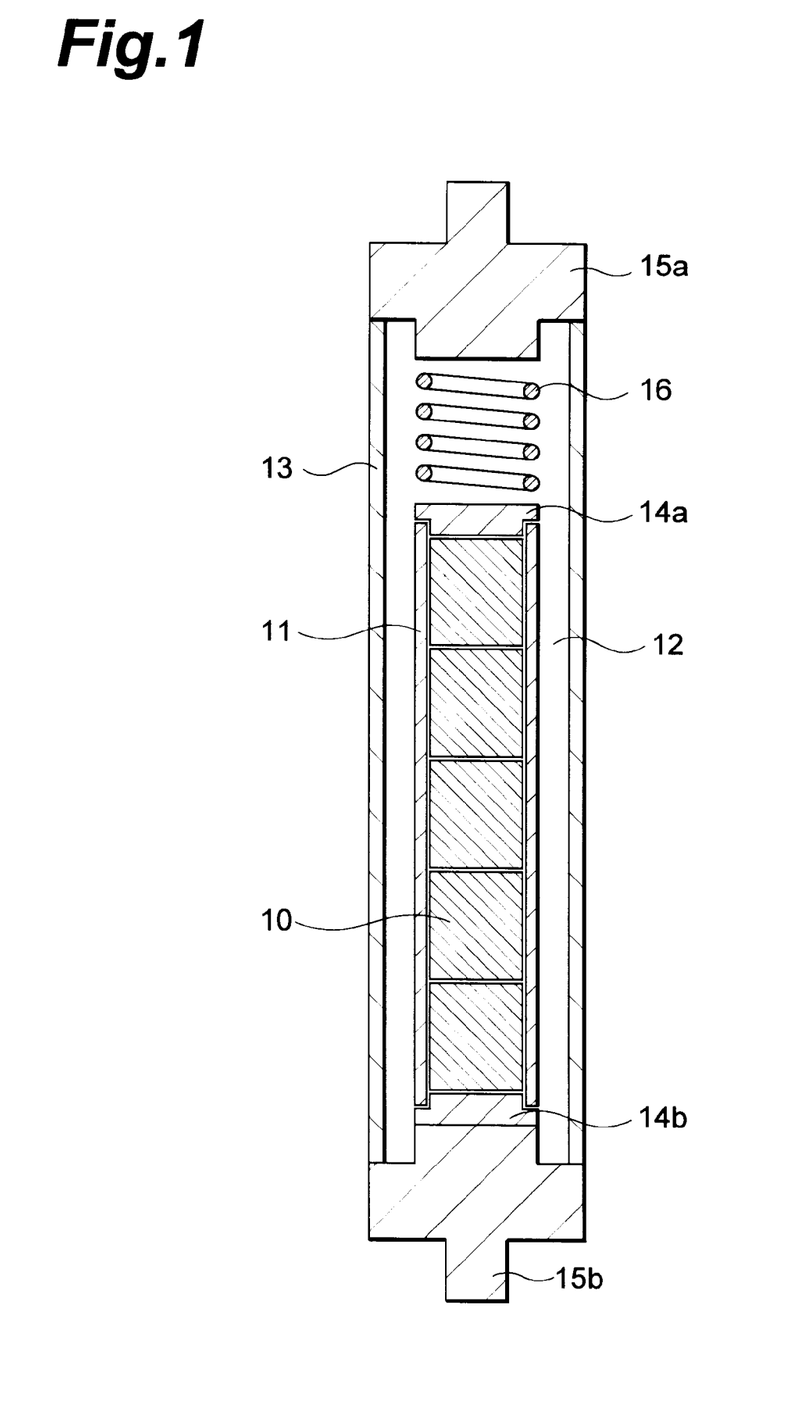
FIG. 1 is a schematic sectional view showing an embodiment of the neutron absorbing pin according to the present invention which includes a sleeve as a shroud.
Figure 2:
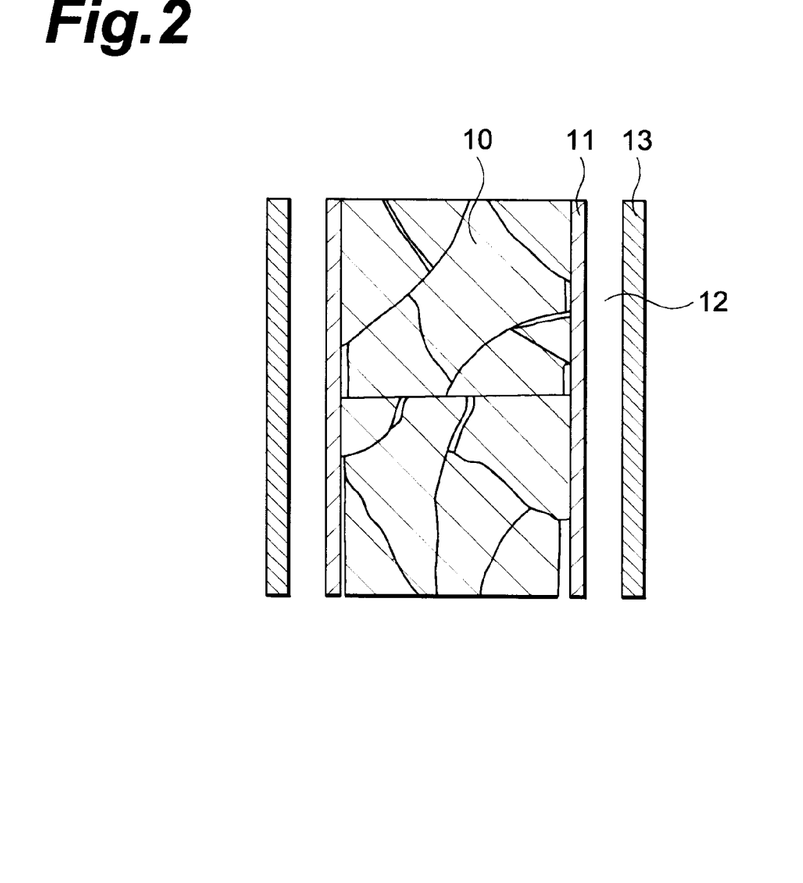
FIG. 2 is a partially enlarged view of FIG. 1.

The schematic sectional view of FIG. 1 shows an example of the neutron absorbing pin according to the present invention having the above-mentioned structure. The schematic sectional view of FIG. 1 shows FIG. 2 is an enlarged view of FIG. 1.

Referring to FIG. 1, a neutron absorber pellet 10 comprising $B_4C$, etc., is disposed in a hollow cylindrical shroud (thin-wall pipe) 11 which comprises an SiC composite material, etc. Further, a hollow cylindrical cladding sleeve 13 (comprising stainless steel, etc.) is disposed outside the shroud 11 with a predetermined gap 12 from the shroud 11.

Both sides of the neutron absorber pellet 10 in the shroud 11 are held by pellet stoppers 14a and 14b, respectively. Further, the neutron absorber pellet 10 and the shroud 11 in the cladding 13 are held by end plugs 15a and 15b respectively disposed at both ends of the cladding 13. Between one end plug 15a and one pellet stopper 14a, there is disposed a pellet-pressing spring 16 for holding the shroud 11 in a suitable state.

(Neutron Absorber)

The neutron absorber usable in the present invention is not particularly restricted as long as it has a coefficient of thermal expansion ($\alpha 1$) which can provide a relationship of $|\alpha 2 - \alpha 1| \leq 10 \times 10^{-6}/K$ with respect to the absolute value of the difference between itself and the coefficient of thermal expansion ($\alpha 2$) of the thin-wall pipe 11. Accordingly, as the neutron absorber usable in the present invention, it is possible to use one which is appropriately selected from known neutron absorbers.

In view of easiness in the provision of the above-mentioned thermal expansion coefficient difference $|\alpha 2 - \alpha 1|$, the coefficient of thermal expansion ($\alpha 1$) of the neutron absorber may preferably be about $3-15 \times 10^{-6}/K$ (more preferably about $5-10 \times 10^{-6}/K$).

Specific examples of such a neutron absorber may include: $B_4C$, $TiB_2$, $B_4C/SiC$ composite material, etc. Among them, in view of the neutron absorbing capacity with respect to high-speed neutrons, boron carbide ($B_4C$) may preferably be used.

(Thin-wall pipe)

The thin-wall pipe 11 surrounding the neutron absorber which is usable in the present invention is not particularly restricted, as long as it has a coefficient of thermal expansion ($\alpha 2$) which can provide the relationship of $|\alpha 2 - \alpha 1| \leq 10 \times 10^{-6}/K$ wit respect to the absolute value of the difference between itself and the coefficient of thermal expansion ($\alpha 1$) of the above-mentioned neutron absorber 10. Accordingly, as the thin-wall pipe 11, it is possible to use one comprising a known material. In view of easiness in the provision of the above-mentioned thermal expansion coefficient difference $|\alpha 2 - \alpha 1|$, the coefficient of thermal expansion ($\alpha 2$) of the thin-wall pipe may preferably be about $3-15 \times 10^{-6}/K$ (more preferably about $5-10 \times 10^{-6}/K$).

Specific examples of the material constituting such a thin-wall pipe may include: ceramic sintered products such as SiC and $Al_2O_3$, fiber-reinforced composite materials produced from these products, heat-resistant metals such as Hastelloy. Among them, in view of the heat resistance, high-temperature strength, etc., it is preferred to use fiber-reinforced ceramic, particularly fiber-reinforced silicon carbide (SiC) or fiber-reinforced alumina ($Al_2O_3$).

Particularly, when a thin sleeve comprising an SiC-fiber-reinforced SiC composite material, which has conventionally been considered to be difficult to be formed into a thin sleeve shape, is used as a shroud, it is possible to obtain a neutron absorbing pin showing good durability even under a severe condition.

The above-mentioned thin-wall pipe 11 may preferably comprise a cylindrical thin-wall sleeve comprising an SiC fiber-reinforced SiC composite material (SiC/SiC), which has a porosity of 40% or less and a wall thickness of 5 mm or less.

When the sleeve comprising an SiC fiber-reinforced SiC-base composite material is inserted, as a shroud 11, between a stainless steel cladding and a $B_4C$ pellet (neutron absorber) 10, there is provided a neutron absorbing pin which has an excellent characteristic such that the shroud is very little damaged by the irradiation thereof with neutrons, it has a tolerance for mechanical damage (i.e., durability in a case where a part of the shroud is mechanically damaged), the movement or migration of the $B_4C$ in the stainless steel cladding 13 can be prevented, and the stainless steel cladding 13 is less liable to be damaged. When a sleeve comprising an SiC fiber-reinforced SiC-base composite material is used as the shroud, unlike in the case where a shroud comprising stainless steel is used, the carburization of the SiC fiber-reinforced SiC-base composite material constituting the sleeve is suppressed to a very low level.

In addition, since the sleeve comprising an SiC fiber-reinforced SiC-base composite material can be formed into a thin-wall sleeve having a wall thickness of 0.5 mm or less, unlike in a case where a thick-wall sleeve is used as a shroud, it is avoided that the amount of the $B_4C$ pellet to be inserted into the shroud is decreased so as to invite a reduction in the neutron-absorbing capacity of the control rod.

The following Tables 1 to 3 show comparisons between various kinds of processes for producing SiC/SiC, comparisons between various kinds of inorganic continuous fibers, and comparisons between various kinds of materials in a case where their usage as a shroud is taken into consideration. With respect to the data on which such comparisons are based, e.g., papers (R. H. Jones, D. Steiner, H. L. Heinisch et al., Journal of Nuclear Materials, 245 (1997) 87–107; F. W. Clinard, Jr., G. F. Hurley and R. W. Klaffky, Res Mechanica, 8 (1983), 207–234) may be referred to.

TABLE 1: Comparisons between Various Kinds of SiC/SiC Production processes in Consideration of Shroud

TABLE 1

| Comparisons between Various Kinds of SiC/SiC Production processes in Consideration of Shroud | | | |
|---|---|---|---|
| PRODUCTION PROCESS | CVI*[1] | RB*[2] | PIP*[3] |
| INSTALLATION (DOMESTIC 1m) | Δ | Δ | ○ |
| DIMENSION OF THIN WALL | Δ | Δ | ○ |
| TOLERANCE FOR MECHANICAL DAMAGE | ○ | ○ | ○ |
| OVERALL EVALUATION | Δ | Δ | ○ |

*[1]impregnation of chemical vapor deposition;
*[2]reaction baking and sintering method;
*[3]polymer impregnation pressing and baking method.

TABLE 2

Comparisons between Various Kinds of Inorganic Continuous Fibers in Consideration of Shroud

| KIND<br>TRADE NAME | $Al_2O_3$ *<br>ALMAX | Si—C—O<br>NICALON | Si—Ti—C—O<br>TIRANO | Si—N—C—O<br>TONEN | SiC/C<br>FP | SiC<br>HI-NICALON |
|---|---|---|---|---|---|---|
| WEAVING PRCOESSABILITY | ◯ | ◯ | ◯ | ◯ | X | ◯ |
| NEWTRON DAMAGE | Δ (SWELLING) | Δ | X (CONTAINING Ti) | Δ (CONTAINING N) | ◯ | ◯ |
| HEAT RESISTANCE (in He, 1300° C.) | ◯ | X (OXYGEN) | X (OXYGEN) | X (NITROGEN) | ◯ | |
| OVERALL EVALUATION | Δ | Δ | X | X | X | ◯ |

TABLE 3

Comparisons between Various Kinds of Materials in Consideration of Shroud

| REQUIRED QUALITY | MONOLITHIC CERAMICS | HEAT-RESISTANT STEEL | C/C*[1] | SiC/SiC*[2] |
|---|---|---|---|---|
| DIMENSION OF THIN WALL (0.3 mm) | X*[4] | ◯ | ◯ | ◯ |
| REACTION WITH STAINLESS STEEL TUBE | ◯ | ◯ | X (CARBURIZATION) | ◯ |
| REACTION WITH $B_4C$ PELLET | ◯ | X (CARBURIZATION) | ◯ | ◯ |
| TOLERANCE FOR MECHANICAL DAMAGE | X (CATASTROPHIC) | ◯ | ◯ | ◯ |
| NEUTRON TRANSMISSIVITY | ◯ | ◯ | ◯ | ◯ |
| OVERALL EVALUATION*[3] | X | Δ | Δ | ◯ |

*[1]C/C: carbon fiber-reinforced carbon composite material
*[2]SiC/SiC: SiC fiber-reinforced SiC composite material
*[4]Difficult to processed.
*[3]Overal evaluation:
The symbol "X" represents a state wherein the corresponding material is marked with "X" twice or more.
The symbol "Δ" represents a state wherein the corresponding material is marked with "X" once.
The symbol "◯" represents a state wherein the corresponding material is marked with no "X".

(Porosity)

In the sleeve 11 constituting the neutron absorbing pin according to the present invention, the porosity thereof may preferably be 40% or less, more preferably 5% to 35% (more preferably, 5% to 15%).

In the present invention, the above-mentioned porosity "p" is defined in the following manner.

p=(true (or absolute) specific gravity-bulk specific gravity)/(true specific gravity)

The above-mentioned "bulk specific gravity" and "true specific gravity" may suitably be measured by the following method.

(Method of Measuring Bulk Specific Gravity)

The volume of a sample to be measured is calculated from its sizes or dimensions, and then the sample is weighed. The bulk specific gravity of the sample is determined from the thus measured data according to the following formula:

bulk specific gravity=weight/volume (Method of Measuring True Specific Gravity)

The principle of the measurement of the true specific gravity is in accordance with the Archimedes method. As the corresponding testing methods according to the JIS (Japanese Industrial Standard), e.g., there is JIS R-7212, wherein butanol (butyl alcohol) is used as a liquid, and the true specific gravity of a sample is measured after it is pulverized into powder having a size of 149 $\mu$m (microns) or less.

More specifically, in such a case, the volume of a sample (after the pulverization) is measured by the above-mentioned Archimedes method using butanol as a liquid. Then the sample is weighed. The true specific gravity of the sample is determined from the thus measured data according to the following formula:

true specific gravity=weight/volume (Wall Thickness)

The sleeve 11 to be used in the present invention may preferably have a wall thickness of 5 mm or less. When the wall thickness exceeds-5 mm, the heat transmissivity of the sleeve tends to be lowered, and a decrease in the inner volume of the sleeve (e.g., a decrease in the capacity of accommodating "another material" such as neutron absorber to be disposed in the sleeve) may be invited.

As long as the mechanical strength required for the sleeve 11 is satisfied, the wall thickness of the sleeve may preferably be as small as possible, in view of the prevention of non-uniform heat transfer or heat transmission, and in view of a reduction in the space occupied by the sleeve per se (i.e., provision of a sufficient space for "another material" such as neutron absorber). More specifically, the wall thickness of the sleeve may preferably be about 3 to 1 mm, more preferably about 1 to 0.5 mm (particularly preferably, about 0.3 to 0.2 mm).

(SiC Fiber)

The SiC (silicon carbide) fiber usable in the present invention is not particularly restricted, but it may preferably be an SiC fiber which is obtained by an electron-beam insolubilizing (infusibility-imparting) method (e.g., see Japanese Laid-Open Patent Application (KOKAI) No. Hei 4-194,028 (i.e., 194,028/1992)) in view of the purity of the SiC fiber.

The composition of the above-mentioned SiC fiber is not particularly restricted. In view of the heat resistance of the fiber, the SiC fiber may preferably be an SiC fiber containing, at least, Si, C and O. Further, it may more preferably be an SiC fiber having a composition in the following composition ranges:

Si: 50% to 70% (more preferably 60% to 70%)

C: 30% to 40% (more preferably 30% to 38%)

O: 0.01% to 14% (more preferably 0.01% to 1%)

The surface of the above-mentioned SiC fiber may be coated (or covered with a coating) as desired. When such a coating is provided on the surface of the SiC fiber, the tolerance for the mechanical damage thereto can be enhanced. In view of easiness in the formation of a dense and uniform interface between the coating and the SiC fiber surface, e.g., it is preferred to use one kind or a combination of at least two kinds of coating selected from the group consisting of: CVD (chemical vapor deposition)-carbon coating, CVD-BN (boron nitride) coating, and CVD-SiC coating.

In view of the weaving property, the SiC fiber (before it is subjected to the composite formation with SiC) may preferably have a diameter of about 5 to 20 $\mu$m, more preferably about 8 to 15 $\mu$m.

(SiC/SiC Composite Material)

As long as a sleeve having a physical property defined in the present invention is provided, the process for producing the SiC/SiC composite material (fiber) constituting the sleeve is not particularly restricted. In view of the tolerance for the mechanical damage to the sleeve, it is preferred to use a CVD method (wherein chemical vapor deposition is effected at a high temperature in a raw material gas), a CVI method (impregnation of chemical vapor deposition, wherein permeation of a chemical vapor deposition gas is effected in a raw material gas at a high temperature), an RB method (reaction baking and sintering method), and a PIP method (polymer impregnation pressing and baking method). Among these, the PIP method is particularly preferably usable in view of easiness in the preparation of a thin-wall sleeve using an SiC/SiC composite material.

As desired, it is also possible to use two or more kinds of the above-mentioned CVD, CVI, RB, and PIP methods in combination.

(Process for Producing Sleeve)

The SiC composite material sleeve to be used in the present invention may be provided, e.g., by circularly knitting a continuous fiber comprising SiC, and then, forming a continuous fiber for constituting a sleeve into an SiC-composite state(SiC/SiC-composite formation), by use of the PIP method, etc.

(Weaving Method)

As long as a sleeve having a desired physical property according to the present invention is provided, the method of weaving the above-mentioned continuous fiber into the sleeve is not particularly restricted, but a known weaving method can be used. In view of uniformity in the wall thickness of the sleeve, it is preferred to use a "circular (or tubular) knitting method" may preferably be used, as the above-mentioned weaving method. With respect to the details of the "circular knitting method", e.g., "Kako Hen (Section of Processing)" of Sen' i Binran (Handbook to Fibers), edited by the Society of Fiber Science and Technology, Japan, p. 502 et seq., published on May 30, 1969 (Showa-44) by Maruzen Co., Ltd. may be referred to.

It is preferred to form a desired sleeve shape, e.g., by inserting a core material (e.g., a bar-shaped or rod-shaped body comprising a metal such as titanium and iron) into the above-mentioned circularly knitted continuous fiber, and as desired, then pulling both of the ends of the circularly knitted fiber product. In this case, prior to the insertion of the core material into the circularly knitted fiber product, a releasing agent, a releasing paper, etc. may be disposed in advance on the surface of the core material, as desired.

It is also possible to use the sleeve as provided above in the next step, as desired, after two or more of the thus provided sleeves are disposed or superposed on each other. In view of the wall thickness of the sleeve, the "number of layers" of the continuous fiber constituting the sleeve may preferably be 3 or less.

At this time, as desired, the second layer to be disposed or superposed on the first layer may be formed into a sleeve-like shape, similarly as that of the first layer. In this case, it is preferred that the continuous fiber for constituting the second layer is formed into a sleeve-like shape, and then both ends of thus formed sleeve-like continuous fiber product are slightly compressed (along the axial direction of the sleeve) so as to provide an outside diameter of the resultant product which is slightly greater than that of the "first layer", and thereafter the thus formed second layer is disposed on the first layer.

In the present invention, in view of easiness in the provision of a dense structure, e.g., it is preferred to use the following woven structure:

count (or thread count): 20 to 30 fibers/inch weaving angle (axial direction): 30° to 60° number of laminated layers: 1 to 2 outside diameter: 12.1 to 12.3 mm porosity (before impregnation): 40% to 60%

The above-mentioned "weaving angle" refers to an angle (acute angle side) formed between the axial direction of the circular knitting and the direction of the continuous fiber constituting the circular knitted product.

The thus provided circular knitted product may be cut into a desired length as desired. At this time, this cutting operation can be carried out by known cutting means (such as diamond cutter). In view of the prevention of the "fraying out" of fibers at the time of the cutting operation, e.g., it is preferred that, as shown in the schematic sectional view of FIG. 1, an appropriate core material 2 (having an outside diameter equal to the inside diameter of a sleeve 1) is inserted into the sleeve 1, a releasing paper 3 (having a thickness of 200 $\mu$m) is wound around the outer periphery of the sleeve 1, and then the sleeve 1 is cut together with the releasing paper 3 and the core material 2. In view of the releasability, the thickness of the above-mentioned releasing paper 3 may preferably be about 100 to 300 $\mu$m.

(Impregnation and Calcination)

There are described preferred embodiments of the present invention in a-case where the SiC fiber is formed into a composite product by using the above-mentioned PIP method.

First, a predetermined core material is inserted into a circular knitted product which has been obtained by weaving an SiC continuous fiber, and is to be impregnated with an organic silane compound. In view of the prevention of the occurrence of "wrinkle" and damage (such as fracture) in this impregnating and calcination step, the core material may preferably have a coefficient of thermal expansion of about 1 to $7 \times 10^{-6}/°$ C. Specific examples of materials having such a coefficient of thermal expansion may include a titanium rod, a CFRP (carbon fiber-reinforced plastic) rod, etc.

In view of the prevention of the occurrence of wrinkle, the outside diameter of the core material may preferably be greater than the inside diameter of the sleeve so as to take account of the shrinkage at the time of the calcination. It is further preferred that the outside diameter of the core material is greater than the inside diameter of the sleeve by about 2% to 10%, based on the inside diameter of the sleeve.

The core material to be inserted into the sleeve may preferably be coated with a release agent or may preferably be wound with a releasing paper in advance. As the "releasing paper" to be used in such a case, it is preferred to use a "release tape" comprising a paper material and an adhesive disposed on the surface thereof to be attached to the core material. Such a release tape can suitably be used for the above-mentioned purpose, since it is easily carbonized by heating at the time of the calcination, whereby it can readily be removed.

(Organic Silicon Compound)

The organic silicon compound usable in the PIP method in the present invention is not particularly restricted, as long as it can provide SiC by a synthetic process. In view of the formation of silicon carbide, it is preferred to use polycarbosilane (—(R)Si—C—)n (wherein R is an alkyl group), polyvinylsilane $CH_3$—Si[($CH_2$=CH) ($CH_3$)Si]n—Si—$CH_3$, polysilastyrene —[Si($C_6H_5$) ($CH_3$)—]$_{n1}$—[Si($CH_3$)$_2$]$_{n2}$—, etc. Among these, it is particularly preferred to use polycarbosilane in view of the ratio (or amount) of the residual product at the time of the calcination.

In view of the impregnating property, the above-mentioned organic silicon compound may preferably have an average molecular weight of about 500 to 100,000 (more preferably about 500 to 3,000). ps (Impregnation)

At the time of the impregnation, it is possible to use a solvent as desired. The solvent to be used for such a purpose is not particularly restricted, as long as it can dissolve the above-mentioned organic silicon compound. In view of the industrial adaptability, it is preferred to use an organic solvent such as xylene, hexane and toluene. In view of the permeability, the concentration of the solution to be used for the impregnation may preferably be about 50% to 100% (more preferably about 50% to 70%).

In order to efficiently carry out the impregnation with the above-mentioned organic silicon compound, a vacuum-pressurization impregnation technique may preferably be used. At this time, the degree of vacuum may preferably be about 0.1 to 20 mmHg, and the applied pressure (gauge pressure) at the time of the pressurization may preferably be about 5 to 10 kgf/cm$^2$.

In view of the a reduction in the wall thickness and homogeneity in the wall thickness of the sleeve, it is also preferred to effect "taping pressurization" after the impregnation of the above-mentioned organic silicon compound. It is preferred to effect such a taping operation, by using a resin tape comprising polyethylene, etc., and winding the tape around the surface of the sleeve (after the impregnation), while pulling the tape by a force at a load of about 1 to 10 kgf. In this case, the load to the tape can be measured by use of a known means such as spring balance. In view of the strength, the above-mentioned tape used for the taping may preferably have a thickness of about 10 to 30 μm and a width of about 5 to 20 mm.

(Calcination)

It is preferred to effect the calcination in an atmosphere of an inactive gas (such as nitrogen and argon) at an ordinary (or atmospheric) pressure at a high temperature, so as to cause SiC to be produced from the organic silicon compound which has been disposed between threads of the SiC fiber by the impregnation therewith. The final heat-treating temperature may preferably be about 800 to 1,600° C. (more preferably about 1,3000° to 1,500° C.).

At the time of this calcination step, in view of the prevention of the warpage which may occur in the sleeve (caused by the warpage, etc., caused in the core material), e.g., it is preferred to support the outside of the sleeve by a "pressing-type mold". In view of easiness in the attachment of/detachment from the sleeve, the pressing-type mold has a split mold-like shape (wherein the cross section in a direction perpendicular to the axis is semicircular).

In order to effectively prevent the occurrence of the warpage in the calcination step, the material constituting the pressing-type mold may preferably have a coefficient of thermal expansion of about 1 to $7 \times 10^{-6}/°$ C. Specific examples of the material having such a coefficient of thermal expansion may include graphite material, etc.

Hereinbelow, the present invention will be described in more detail with reference to specific Examples.

EXAMPLES

Example 1

(Formation of Sleeve)

A continuous fiber having a diameter of 14 μm comprising SiC (mfd. by Nippon Carbon Co., Ltd.; trade name: Hi-Nicalon) was circularly knitted so as to provide a circularly knitted sleeve having an outside diameter of 12.0 mm, a thread count of 20 to 30 fibers/inch, a weaving angle (in the axial direction) of 30° to 60°, and a wall thickness of 0.2 mm.

Figure 3:
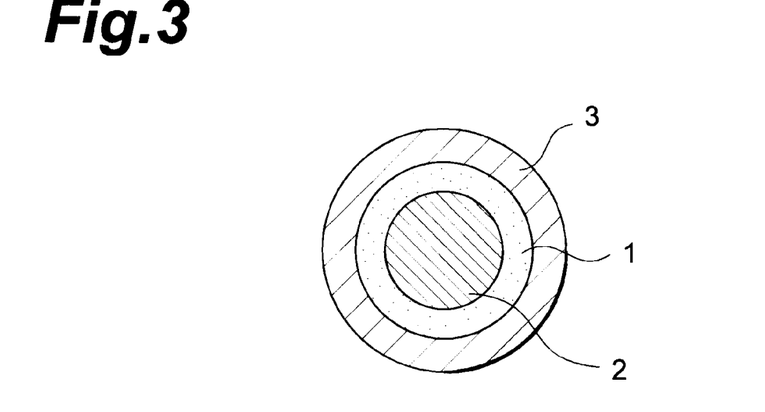
FIG. 3 is a schematic sectional view showing a multi-layer state of a core, a sleeve and a releasing paper, when the sleeve is cut with a cutter after the weaving thereof.

Referring to FIG. 3, a core material 2 having an outside diameter of 12 mm was inserted into the circularly knitted sleeve 1 provided above, and thereafter a releasing paper 3 having a thickness of 200 μm was wound around the outer periphery of the sleeve for the purpose of preventing the fibers from fraying out, whereby the sleeve was held. The sleeve thus wound with the releasing paper 3 was cut by a diamond cutter into a predetermined length (1 m). The thus obtained sleeve had a porosity of 55%.

On the other hand, a titanium rod having an outside diameter of 11.4 mm and a length of 1,200 mm was wound with a paper-type releasing paper comprising an organic matter which was to be carbonized. The titanium rod wound with the releasing paper was inserted into the above-mentioned SiC fiber sleeve which had been cut in the above manner.

The sleeve was disposed in an air-tight vessel, the vessel was then evacuated to provide a vacuum state (1 mmHg) and retained in this state for 10 minutes. Thereafter, 180 ml of a 50% solution (solvent: xylene) of an organic silicon compound of polycarbosilane (Si($CH_3$)$CH_2$—)n (mfd. by Nippon Carbon Co., Ltd.; trade name: NIPUSI) having an average molecular weight of 2,000, was poured into the above vessel. Further, the vessel was pressurized (10 kg/cm$^2$) and retained for 180 minutes so that the interior of the sleeve was impregnated with the resin solution.

Thereafter, the outer periphery of the sleeve was pressed by taping with a polyethylene tape (having a thickness of 15 μm and a width of 15 mm) at a load of 2 kgf.

Around the outer periphery of thus impregnated sleeve after the taping, there was disposed a graphite-mold in a cylindrical shape of "split-type mold" (separable into two pieces along its axial direction) having an inside diameter which was equal to the outside diameter of the sleeve. While such a load (about 2 kgf) was applied thereto so as to retain the above-mentioned shape, the sleeve was sintered with an inactive gas (argon gas) at 1,350° C. for 60 minutes, thereby to prepare a thin-wall SiC fiber-reinforced SiC composite material sleeve (PIP method).

After the sintering, the above-mentioned Ti rod was removed from the sleeve, and the matter attached to the inside and outside of the sleeve was removed by using a sandpaper #100, while taking care so as not to damage the SiC fiber.

The end faces of the sleeve after the above-mentioned density-imparting treatment were cut so as to provide a finished sleeve having a predetermined length (100 cm).

The thus provided sleeve had a porosity of 30%, and no transmission of light was observed when observed with naked eyes. When the sleeve was placed on a flat surface, and the maximum gap between the flat surface and the sleeve was measured by use of a "clearance gauge", it was found that the warpage was about 0.1 mm with respect to a sleeve length of 1 m.

Example 2
(Preparation of Sleeve by CVI Method and RB Method)

Thin-wall sleeves comprising SiC fiber-reinforced SiC composite material (SiC/SiC) were provided in the same manner as Example 1 except that a CVI method (chemical vapor deposition gas infiltrating method) or RB method (reaction baking method) were respectively used under the following conditions, instead of the PIP method (polymer impregnation pressing method) used in Example 1.
<Conditions of CVI Method>

In an atmosphere of silicon tetrachloride $SiCl_4$, methane $CH_4$, and a hydrogen gas carrier, gases were permeated and deposited into the sleeve base material at 10 torr at 1,300° C.
<Conditions of RB Method>

The base material SiC sleeve was impregnated with a slurry comprising carbon black, phenol resin, and β-Sic powder dispersed in water. The resultant product was dried, and thereafter the sleeve was further impregnated with molten silicon in a vacuum at a temperature of 1,450° C.

Example 3
(Alumina-Fiber-Reinforced Alumina Pipe)

A sleeve comprising alumina-fiber-reinforced alumina was obtained in the same manner as in Example 1 except that the following conditions were employed.

An alumina fiber (having a diameter of 10 μm) was woven into a tubular form by use of bias weaving (500 to 1,000 filaments/yarn) using a mandrel (core material), the thus obtained woven tubular fiber was impregnated with an alumina binder (50% of alumina powder, 25% of an aqueous aluminum chloride salt solution, 25% of alumina sol, and suitable amount of a solvent), thereby to effect a shaping operation. Then, a firing (calcination) operation was carried out at a high temperature (1,100° C.), thereby to fix the alumina binder to the fiber. Both ends of thus obtained tube were cut thereby to obtain a sleeve (having a length of about 800 mm, a diameter of about 15 mm, and a wall thickness of about 0.2 mm).

Example 4

(Evaluation of Mechanical Characteristic of Ceramic Composite Thin Pipe at High Temperature)

Tensile strength at 1,200° C. of each of the ceramic composite thin-wall pipes comprising the silicon carbide fiber and alumina fiber obtained by the above-mentioned Examples was measured under the following conditions.

(Evaluation of Mechanical Characteristic of Ceramic Matrix Composite (CMC))

There is no evaluation standard for mechanical property of a sleeve-shaped CMC. Therefore, flat sheets comprising various kinds of ceramic matrix composite materials (CMC) were prepared and subjected to a high-temperature tensile test and a room-temperature bending test (after exposure thereof to a high temperature), according to standards of "PEC-TS CMC 01: Room-Temperature and High-Temperature Tensile Strength-Distortion Behavior Testing Method for Long Fiber-Reinforced Ceramic-Base Matrix Composite" and "PEC-TS CMC 04: Room-Temperature and High-Temperature Bending Strength Testing Method for Long Fiber-Reinforced Ceramic-Base Matrix Composite". With respect to the details of these PEC-TS standards, e.g., papers (PEC-TS CMC 01, 09) may be referred to.

The following Tables 4 to 8 show thus obtained results of high-temperature tensile tests and high-temperature durability.

TABLE 4

<Values of strength and breaking elongation of ceramic composite thin-wall pipes at 1200° C.>

|  | Strength (Mpa) | Breaking elongation (%) |
|---|---|---|
| Silicon carbide fiber | 5 | 8.1 |
| Alumina fiber | 33 | 4.9 |

From the values of the strength and breaking elongation as shown in the above Table 4, it can be easily understood that, at a high temperature of 1,200° C., the material used in this example has a strength sufficient for preventing boron carbide fragments from moving and retains an amount of distortion which follows up (or corresponds to) the swelling of the boron carbide.

TABLE 5

High-Temperature Tensile Strength at Respective Temperatures in Air
(interface: boron nitride; reinforced fiber: Hi-Nicalon; production process: PIP method)

| Temperature | Tensile strength |
|---|---|
| 20° C. | 350 Mpa |
| 400° C. | 350 MPa |
| 1,200° C. | 230 Mpa |
| 1,400° C. | 160 Mpa |

TABLE 6

High-Temperature Tensile Strength at Respective
Temperatures in Air
(interface: carbon; reinforced fiber: Nicalon; production
process: PIP method)

| Temperature | Tensile strength |
| --- | --- |
| 20° C. | 110 Mpa |
| 400° C. | 110 MPa |
| 600° C. | 60 Mpa |
| 1,000° C. | 50 Mpa |

TABLE 7

Room-Temperature Bending Strength After High-
Temperature Exposure at 1,400° C. in Air
(interface: boron nitride; reinforced fiber: Hi-Nicalon;
production process: PIP method)

| Exposure time | Bending strength |
| --- | --- |
| 0 h | 400 MPa |
| 200 h | 400 MPa |
| 600 h | 400 Mpa |

TABLE 8

Room-Temperature Bending Strength After High-
Temperature Exposure at 1,400° C. in Air
(interface: carbon; reinforced fiber: Nicalon; production
process: PIP method)

| Exposure time | Bending strength |
| --- | --- |
| 0 h | 300 MPa |
| 200 h | 100 MPa |
| 600 h | 50 MPa |

Example 5
(Compatibility with Boron Carbide)

The compatibility of the ceramic fiber thin-wall pipe obtained in Example 1 with boron carbide at a high temperature was evaluated by the following method.

<Method of Evaluating Compatibility with Boron Carbide>

The test for evaluating the comparability of the ceramic fiber thin-wall pipe with boron carbide was carried out at 1,000° C. and 1,300° C. Each of a high-purity alumina sintered product, a silicon carbide fiber composite material, and stainless steel, for the purpose of comparison with the material according to the present invention, was formed into a square sheet having a thickness of about 2 to 3 mm and a side of about 15 mm, or into a disc having a thickness of about 2 to 3 mm and a diameter of 12 to 20 mm, and each of the sample surfaces was polished until it provided a mirror surface. Then, the sample surfaces and boron carbide surfaces were caused to closely contact each other by alternately superposing each sample and boron carbide, while applying thereto a force of 10 gf per 1 cm². Each of the resultant product was heated in a horizontal-type tubular electric furnace in a helium atmosphere at a slightly positive pressure. They were heated at two different temperatures of 1,000° C. and 1,300° C. for a heating retention time of 500 h.

After the completion of the heating, the state of the reaction of each sample after it was caused to contact boron carbide, was observed by an optical microscope and a scanning electron microscope (SEM). From the observation of each sample surface which had been caused to contact boron carbide, in the case of the alumina and silicon carbide, substantially no reaction layer was observed in the sample for both temperatures of 1,000° C. and 1,300° C., thereby to provide good results. On the other hand, in the case of the stainless steel, a marked reaction thereof with boron carbide was observed, whereby the boron carbide pellet was partially fused to stainless steel even for 1,000° C. These results are summarized in the following Table 9.

TABLE 9

Results of Compatibility Test between Ceramic Composite
Thin-Wall Pipe and Boron Carbide

| <Test conditions> | <1000° C. × 500 h> | <1300° C. × 500 h> |
| --- | --- | --- |
| Silicon carbide | ** | ** |
| Alumina | ** | ** |
| Stainless steel | 170–400 | 400–600 |

(**: The thickness of the reaction layer was less than the detection limit (1 μm).)

From the above Table 9, it can easily be understood that the ceramic composite thin-wall pipe used in this example is superior to that comprising stainless steel.

As described above, according to the present invention, there is provided a neutron absorbing pin, comprising: at least, a neutron absorber, a thin-wall pipe surrounding said neutron absorber, and a cladding disposed at a distance from said thin-wall pipe; wherein the difference between the coefficient of thermal expansion ($\alpha 1$) of said neutron absorber and the coefficient of thermal expansion ($\alpha 2$) of said thin-wall pipe has an absolute value of $|\alpha 2 - \alpha 1| \leq 10 \times 10^{-6}/K$.

In the neutron absorbing pin according to the present invention, the thermal characteristics of the respective elements constituting the pin are appropriately controlled, and therefore it is possible to retain not only good heat resistance and mechanical characteristic but also good compatibility between the constituents thereof at a high temperature, preferably, from about 850° C. to 1,500° C. Accordingly, the present invention can provide a neutron absorbing pin having a long life.

Particularly, in an embodiment using a fiber-reinforced ceramic (fiber-reinforced SiC or fiber-reinforced $Al_2O_3$) as the material for the above-mentioned thin-wall pipe, a neutron absorbing pin which has a longer life and is excellent in the compatibility thereof with the neutron absorber (boron carbide, etc.) can be obtained. Since such a neutron absorbing pin shows a ductility-like fracture characteristic, it can easily absorb swelling of the boron carbide pellet, and also shows an excellent compatibility with the neutron absorber. That is, in such a neutron absorbing pin, even when the circumferential stress of the thin-wall pipe-exceeds the fracture limit thereof due to the swelling of the boron carbide pellet, fracture can be prevented from proceeding at one stroke due to the pull-out (or drawing) effect of the fiber, thereby to suppress the movement of the neutron absorber pellet fragments until the end of its use.

In addition, the neutron absorbing pin according to the present invention shows good compatibility between the shroud and the neutron absorber (as compared with that of stainless steel) even at a low temperature, and therefore it is possible to attain a longer life not only in the embodiment of a helium-bonded pin but also in the embodiment of a sodium-bonded pin.

From the invention thus described, it will be obvious that the invention may be varied in many ways. Such variations are not to be regarded as a departure from the spirit and scope of the invention, and all such modifications as would be obvious to one skilled in the art are intended to be included in the scope of the following claims.

The basic Japanese Application No. 341,739/1997 filed on Dec. 11, 1997 is hereby incorporated by reference.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A neutron absorbing pin, comprising: at least, a neutron absorber, a pipe surrounding the neutron absorber, and a cladding disposed at a distance from the pipe;

wherein the difference between the coefficient of thermal expansion ($\alpha 1$) of the neutron absorber and the coefficient of thermal expansion ($\alpha 2$) of the pipe has an absolute value of $|\alpha 2 - \alpha 1| \leq 10 \times 10^{-6}/K$.

2. A neutron absorbing pin according to claim 1, wherein the pipe comprises a fiber-reinforced ceramic.

3. A neutron absorbing pin according to claim 2, wherein the fiber-reinforced ceramic is fiber-reinforced silicon carbide (SiC) or fiber-reinforced alumina ($Al_2O_3$).

4. A neutron absorbing pin according to claim 1, wherein the neutron absorber comprises boron carbide ($B_4C$).

* * * * *